US012394038B2

United States Patent
Ouchi et al.

(10) Patent No.: US 12,394,038 B2
(45) Date of Patent: Aug. 19, 2025

(54) IMAGE PROCESSING PROGRAM, IMAGE PROCESSING DEVICE, AND IMAGE PROCESSING METHOD

(71) Applicant: Hitachi High-Tech Corporation, Tokyo (JP)

(72) Inventors: Masanori Ouchi, Tokyo (JP); Shinichi Shinoda, Tokyo (JP); Yasutaka Toyoda, Tokyo (JP); Ryou Yumiba, Tokyo (JP); Hiroyuki Shindo, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 494 days.

(21) Appl. No.: 17/596,025

(22) PCT Filed: Jun. 13, 2019

(86) PCT No.: PCT/JP2019/023447
§ 371 (c)(1),
(2) Date: Dec. 2, 2021

(87) PCT Pub. No.: WO2020/250373
PCT Pub. Date: Dec. 17, 2020

(65) Prior Publication Data
US 2022/0318975 A1 Oct. 6, 2022

(51) Int. Cl.
*G06T 7/00* (2017.01)
*G06T 9/00* (2006.01)

(52) U.S. Cl.
CPC .............. *G06T 7/001* (2013.01); *G06T 9/005* (2013.01); *G06T 2207/30148* (2013.01)

(58) Field of Classification Search
CPC .................. G06T 7/001; G06T 9/005; G06T 2207/30148; G06T 2207/10061;
(Continued)

(56) References Cited

U.S. PATENT DOCUMENTS 9,965,901 B2   5/2018   Zhang et al.
2011/0274342 A1  11/2011  Maeda et al.
(Continued)

FOREIGN PATENT DOCUMENTS

CN   107123114 A   9/2017
CN   108351600 A   7/2018
(Continued)

OTHER PUBLICATIONS

Japanese-language Office Action issued in Japanese Application No. 2022-165935 dated Aug. 22, 2023 with English translation (5 pages).
(Continued)

*Primary Examiner* — Roy M Punnoose
(74) *Attorney, Agent, or Firm* — Crowell & Moring LLP

(57) ABSTRACT

The purpose of the present invention is to provide a computer program for achieving die-to-database inspection at high speed and with few false reports, and a semiconductor inspection device using the same. To achieve this purpose, the present invention proposes: a computer program comprising an encoder layer that is configured to determine the features of a design data image, and a decoder layer that is configured to generate, on the basis of a variation in an image (inspection target image) obtained by photographing an inspection target pattern, a statistic pertaining to the brightness values of pixels from feature values output by the encoder layer, wherein die-to-database inspection with few false reports can be achieved by comparing the inspection target image and the statistic obtained from the decoder layer and pertaining to the brightness values, and thereby detecting a defect region in the image; and a semiconductor inspection device using the same.

18 Claims, 12 Drawing Sheets

(58) Field of Classification Search
CPC . G06T 2207/20081; G06T 2207/20084; G06T 7/00; G06N 20/00
See application file for complete search history.

(56) References Cited

U.S. PATENT DOCUMENTS

| | | | |
|---|---|---|---|
| 2015/0110406 | A1 | 4/2015 | Ohashi et al. |
| 2017/0148226 | A1 | 5/2017 | Zhang et al. |
| 2017/0200264 | A1 | 7/2017 | Park et al. |
| 2019/0147127 | A1 | 5/2019 | Su et al. |
| 2019/0155164 | A1 | 5/2019 | Chen et al. |
| 2019/0186910 | A1 | 6/2019 | Fukuda |
| 2019/0370955 | A1* | 12/2019 | Zhang ............... G06T 7/0004 |
| 2021/0397198 | A1* | 12/2021 | Soltani Bozchalooi ............... G06N 20/00 |

FOREIGN PATENT DOCUMENTS

| | | |
|---|---|---|
| JP | 2010-151655 A | 7/2010 |
| JP | 2011-55004 A | 3/2011 |
| JP | 2011-141133 A | 7/2011 |
| TW | 201407657 A | 2/2014 |
| TW | 201732305 A | 9/2017 |
| TW | 201741762 A | 12/2017 |
| TW | I648517 B | 1/2019 |

OTHER PUBLICATIONS

International Search Report (PCT/ISA/210) issued in PCT Application No. PCT/JP2019/023447 dated Sep. 3, 2019 with English translation (two (2) pages).

Japanese-language Written Opinion (PCT/ISA/237) issued in PCT Application No. PCT/JP2019/023447 dated Sep. 3, 2019 (four (4) pages).

International Preliminary Report on Patentability (PCT/IPEA/409) issued in PCT Application No. PCT/JP2019/023447 dated Mar. 11, 2020 (three (3) pages).

Chinese-language Office Action issued in Taiwanese Application No. 109111264 dated Feb. 19, 2021 with English translation (26 pages).

Chinese-language Office Action issued in Taiwanese Application No. 109111264 dated Oct. 5, 2021 with English translation (9 pages).

Chinese-language Office Action issued in Taiwanese Application No. 112148609 dated May 3, 2024 with English translation (14 pages).

Korean-language Office Action issued in Korean Application No. 10-2021-7038957 dated Jun. 21, 2024 with English translation (6 pages).

Chinese-language Office Action issued in Chinese Application No. 201980097253.6 dated Mar. 20, 2025 with partial English translation (18 pages).

* cited by examiner

IMAGE PROCESSING PROGRAM, IMAGE PROCESSING DEVICE, AND IMAGE PROCESSING METHOD

TECHNICAL FIELD

The present invention relates to an image processing technique for processing image data. Among image processing techniques, the present invention particularly relates to an image processing technique applicable to inspection using image data. An example of an inspection target includes a semiconductor circuit.

BACKGROUND ART

Currently, as an inspection using image data, design data of a sample being an inspection target is compared with photographed data obtained by photographing an image of the inspection target. As an example of an article, there is an article that inspects a semiconductor circuit.

With the miniaturization of a semiconductor circuit pattern, the resolution of a light exposure device reaches a limit, and it is becoming difficult to form a circuit pattern as designed, on a wafer. In a circuit pattern formed on a semiconductor wafer, the width of a wiring deviates from a design value, a pattern tip is degenerated, or a defect such as shape deformation of a corner or a root of a pattern easily occurs. Such a defect is referred to as a systematic defect and occurs in common in all dies. Thus, it is difficult to detect such a defect by a method (die-to-die inspection) of detecting the defect by comparing a die as an inspection target die and the adjacent die to each other.

On the other hand, there is a method (die-to-database inspection) of detecting a defect by comparing a design data image obtained by imaging design data such as CAD data instead of a proximity die with a die as an inspection target. Since, in the die-to-database inspection, the design data image is compared with the die as the inspection target, it is theoretically possible to detect the systematic defect common in all the dies.

However, on the pattern transferred onto the wafer, there are many shape deviations (differences in rounding of corners, and the like) from design data that do not have an influence on electrical characteristics of the semiconductor device. In the die-to-database, there is a problem that false reports indicating that such a shape deviation is also detected frequently occur. In order not to erroneously detect a normal circuit pattern as a defect, it is necessary to allow a shape deviation in a normal range.

U.S. Pat. No. 9,965,901 B2 (PTL 1) discloses a method of simulating an image of an inspection target pattern from design data by using CNN. By applying such a method to the die-to-database inspection and using a simulated image of an inspection target pattern having a non-defective product shape deviation instead of the design data, it is possible to perform the inspection while suppressing the false report.

CITATION LIST

Patent Literature

PTL 1: U.S. Pat. No. 9,965,901 B2

SUMMARY OF INVENTION

Technical Problem

In PTL 1, although the simulated inspection target pattern is obtained, the obtained inspection target image is an example of different shape deformation depending on the manufacturing cycle. Therefore, it is necessary to perform simulation a plurality of times in order to know the range of normal shape deformation. Furthermore, when the above method is applied to the die-to-database inspection, it is necessary to compare a plurality of generated simulated images with an inspection image in a round-robin manner. Thus, there is a problem that processing time is required.

Solution to Problem

In order to achieve the above object, in the present invention, a feature value of a sample is calculated on the basis of reference data such as design data, and a statistic indicating probability distribution of a value that may be taken by input data of the sample is calculated from the feature value. In addition, any of calculation or adjustment of parameters with respect to the calculated feature value, process evaluation using the feature value, and sample inspection may be incidentally performed.

As one aspect of the present invention, there are provided an image processing program, an image processing device, and an image processing method in which an encoder layer configured to determine a feature of a design data image and a decoder layer configured to generate a statistic of a brightness value of each pixel on the basis of a variation of a photographed image of an inspection target pattern from the feature value output by the encoder layer are provided, and a defect in an image region is detected by comparing the statistic pertaining to the brightness value obtained from the decoder layer with the photographed image of the inspection target pattern. Note that the image processing includes generation of a model configured by the encoder layer and the decoder layer and adjustment of parameters included in the model.

The present invention can be applied to various objects such as automobile components (pistons and the like), containers such as trays and bins, and liquid crystals in addition to the semiconductor circuit, as an inspection target. In addition, the present invention includes inputting data indicating the shape or physical property of the sample in addition to photographing the image. The shape includes the size, the length, and the like of the sample.

Advantageous Effects of Invention

According to the present invention, it is possible to estimate a normal range of data indicating the shape, the physical property, and the like of a sample from reference data on the basis of a correspondence relation between the reference data such as design data of the sample and the data indicating the shape, the physical property, and the like of the sample.

DESCRIPTION OF EMBODIMENTS

A semiconductor inspection device exemplified in an example described below relates to an image processing program for preventing the frequent occurrence of false reports by using a photographed image (inspection target image) of an inspection target pattern and a design data image and detecting only a defective region, and a semiconductor inspection device using the image processing program. Note that, in addition to design data, a simulation image of a semiconductor manufacturing process, an average image of a circuit pattern, a handwritten image, and the like can also be applied to the comparison with the inspection target image, and the present example is not limited to this.

Furthermore, as a specific example thereof, an example of a method as follows will be described: a brightness value of each pixel on an inspection target image is estimated from a design data image by using machine learning, as a statistic for defining the probability distribution thereof, and a defective region of the inspection target image is detected on the basis of the estimated statistic. In the present example, the statistic pertaining to the shape deformation of the circuit pattern is set as a statistic for defining the probability distribution of the brightness value of each pixel on the photographed image, which is obtained from the correspondence relation between the design data image and the photographed image.

Hereinafter, a device and a measurement inspection system having a function of detecting only a defective region without causing false reports to frequently occur, by using an inspection target image and a design data image will be described with reference to the drawings. More specifically, a device and a system including a critical dimension scanning electron microscope (CD-SEM) being one kind of a measurement device will be described.

In the following description, a charged particle beam device is exemplified as a device that forms an image. In addition, as one aspect thereof, an example using a SEM will be described, but the present invention is not limited thereto. For example, a focused ion beam (FIB) device that scans an ion beam on a sample to form an image may be employed as the charged particle beam device. However, in order to measure a pattern in which miniaturization progresses, with high accuracy, an extremely high magnification is required. Thus, it is generally desirable to use an SEM that is superior to the FIB device in terms of resolution.

Figure 13:
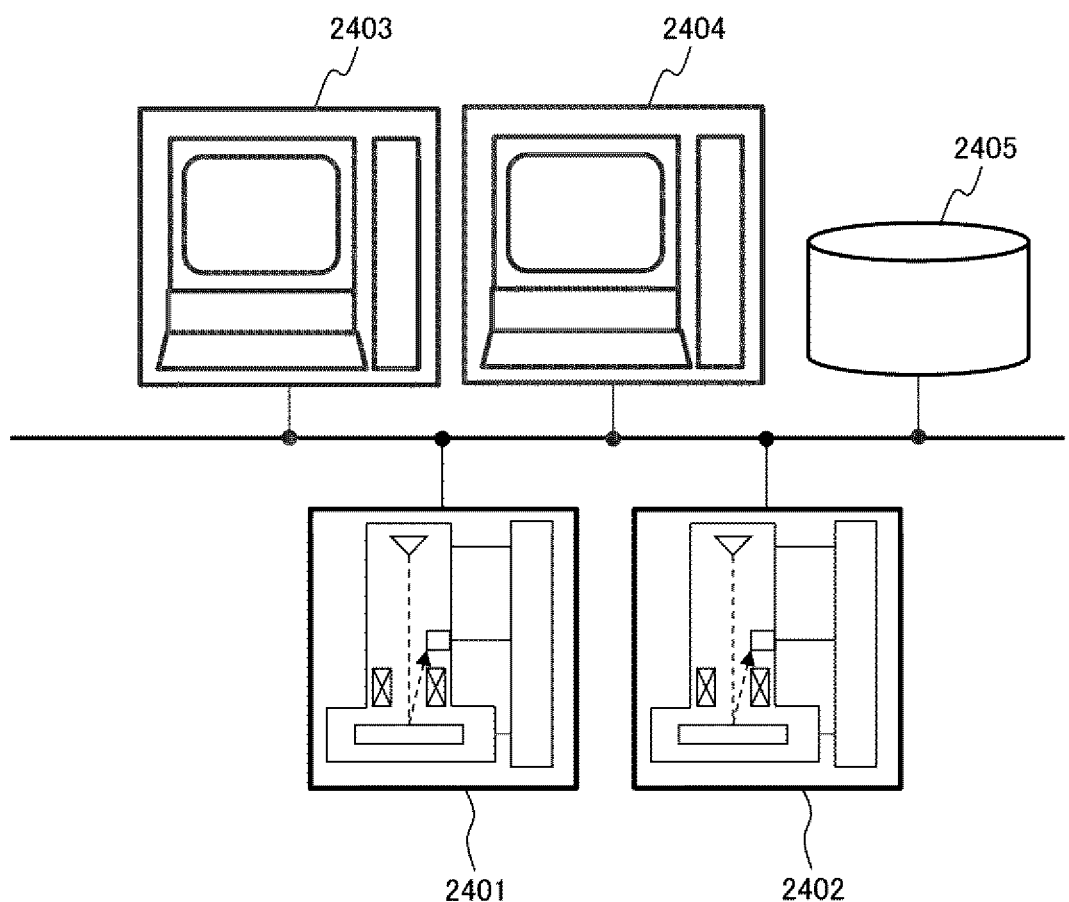
FIG. 13 is a diagram illustrating an example of a semiconductor measurement system.

FIG. 13 is a schematic explanatory diagram of a measurement and inspection system in which a plurality of measurement or inspection devices are connected to a network. In such a system, the following devices are connected via a network. One of the devices is a CD-SEM 2401 that measures pattern dimensions of a semiconductor wafer, a photomask, or the like. In addition, as another device, there is a defect inspection device 2402 that acquires an image by irradiating a sample with an electron beam and extracts a defect on the basis of a comparison between the acquired image and a reference image registered in advance. In addition, a condition setting device 2403, a simulator 2404, and a storage medium 2405 are connected to the network. The condition setting device 2403 has a function of setting a measurement position, a measurement condition, and the like on design data of a semiconductor device. The simulator 2404 has a function of simulating performance of a pattern on the basis of design data of a semiconductor device, manufacturing conditions of a semiconductor manufacturing device, and the like. Furthermore, the storage medium 2405 stores design data in which layout data and manufacturing conditions of the semiconductor device are registered.

The design data is expressed in, for example, a GDS format or an OASIS format, and is stored in a predetermined format. Note that the type of the design data is not limited as long as software for displaying the design data can display the format thereof and can handle the design data as graphic data. In addition, the storage medium 2405 may be incorporated in a control device of a measurement device or an inspection device, or the condition setting device 2403 or the simulator 2404. Note that the CD-SEM 2401 and the defect inspection device 2402 are provided with respective control devices, and control necessary for each device is performed. However, these control devices may be equipped with a function of the simulator, a function of setting measurement conditions, and the like.

In the SEM, an electron beam emitted from an electron source is focused by a plurality of stages of lenses, and the focused electron beam is scanned one-dimensionally or two-dimensionally on a sample by a scanning deflector.

Secondary electrons (SE) or backscattered electrons (BSE) emitted from the sample by the scanning with the electron beam are detected by a detector and stored in a storage medium such as a frame memory in synchronization with the scanning of the scanning deflector. Image signals stored in the frame memory are integrated by an arithmetic operation device mounted in the control device. In addition, scanning by the scanning deflector can be performed in any size, position, and direction.

The control and the like as described above are performed by the control device of each SEM. An image and a signal obtained as a result of scanning with the electron beam are transmitted to the condition setting device 2403 via a communication line network. In the present example, description will be made on the assumption that the control device that controls the SEM and the condition setting device 2403 are separate devices, but the present invention is not limited thereto. For example, the device control and measurement processing may be collectively performed by the condition setting device 2403, or the control of the SEM and the measurement processing may be performed together by each control device.

In addition, a program for performing the measurement processing is stored in the condition setting device 2403 or the control device, and measurement or calculation is performed in accordance with the program.

In addition, the condition setting device 2403 has a function of creating a program (recipe) for controlling the operation of the SEM on the basis of the design data of the semiconductor, and functions as a recipe setting unit. Specifically, the condition setting device sets positions and the like for performing processing necessary for the SEM, such as desired measurement points, autofocus, auto-stigma, and addressing points which are on design data, contour line data of a pattern, or design data subjected to simulation. Then, the condition setting device creates a program for automatically controlling the sample stage, the deflector, and the like of the SEM, on the basis of the setting. In addition, in order to create a template described later, a program for causing a processor that extracts information of a region serving as a template from design data and creates the template on the basis of the extraction information, or a general-purpose processor to create the template is built in or stored. In addition, the program may be distributed via a network.

Figure 14:
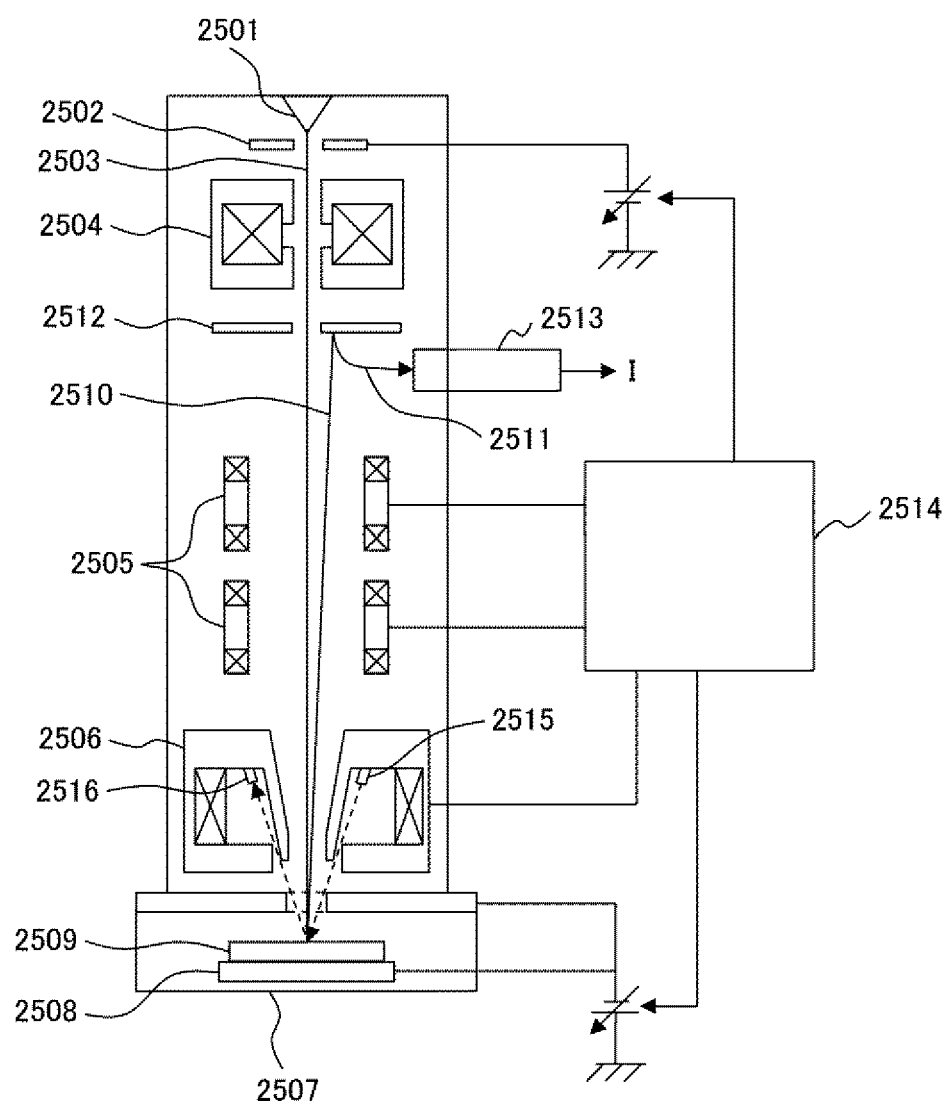
FIG. 14 is a schematic diagram illustrating a scanning electron microscope.

FIG. 14 is a schematic configuration diagram of the scanning electron microscope. An electron beam 2503 that is extracted from an electron source 2501 by an extraction electrode 2502 and accelerated by an acceleration electrode (not illustrated) is narrowed by a condenser lens 2504 being a form of a focusing lens. Then, a sample 2509 is scanned one-dimensionally or two-dimensionally by a scanning deflector 2505. The electron beam 2503 is decelerated by a negative voltage applied to an electrode built in a sample stage 2508, is focused by a lens action of an objective lens 2506, and then is emitted onto the sample 2509.

When the sample 2509 is irradiated with the electron beam 2503, electrons 2510 such as secondary electrons and backscattered electrons are emitted from the irradiated portion. The emitted electrons 2510 are accelerated in a direction of the electron source by an acceleration action on the basis of the negative voltage applied to the sample. The accelerated electrons collide with a conversion electrode 2512, and generate secondary electrons 2511. The secondary electrons 2511 emitted from the conversion electrode 2512 are captured by a detector 2513, and the output I of the detector 2513 changes depending on the captured amount of the secondary electrons. The brightness of a display device (not illustrated) changes depending on the output I. For example, in a case of forming a two-dimensional image, an image of a scanning region is formed by synchronizing a deflection signal to the scanning deflector 2505 with the output I of the detector 2513. In addition, the scanning electron microscope illustrated in FIG. 22 is provided with a deflector (not illustrated) that moves the scanning region of the electron beam.

Note that, in the example of FIG. 14, an example in which the electrons emitted from the sample are converted at one end by the conversion electrode and detected has been described. However, of course, the present invention is not limited to such a configuration. For example, a configuration in which a detection surface of an electron multiplier tube or a detector is disposed on an orbit of accelerated electrons can be made. A control device 2514 has a function of controlling each component of the scanning electron microscope and forming an image on the basis of detected electrons, and a function of measuring a pattern width of a pattern formed on a sample on the basis of intensity distribution of detected electrons, which is called a line profile.

Next, an aspect of model creation processing S100, process evaluation processing S200, or defect detection processing S300 for defect detection using machine learning will be described. The model creation processing S100, the process evaluation processing S200, or the defect detection processing S300 can also be performed by an arithmetic operation device built in the control device 2514 or having image processing built therein. In addition, image evaluation can be performed by an external arithmetic operation device (for example, the condition setting device 2403) via a network. Note that the processing sharing between the arithmetic operation device built in the control device 2514 or having image processing built therein, and the external arithmetic operation device can be appropriately set, and is not limited to the above-described example.

Figure 1:
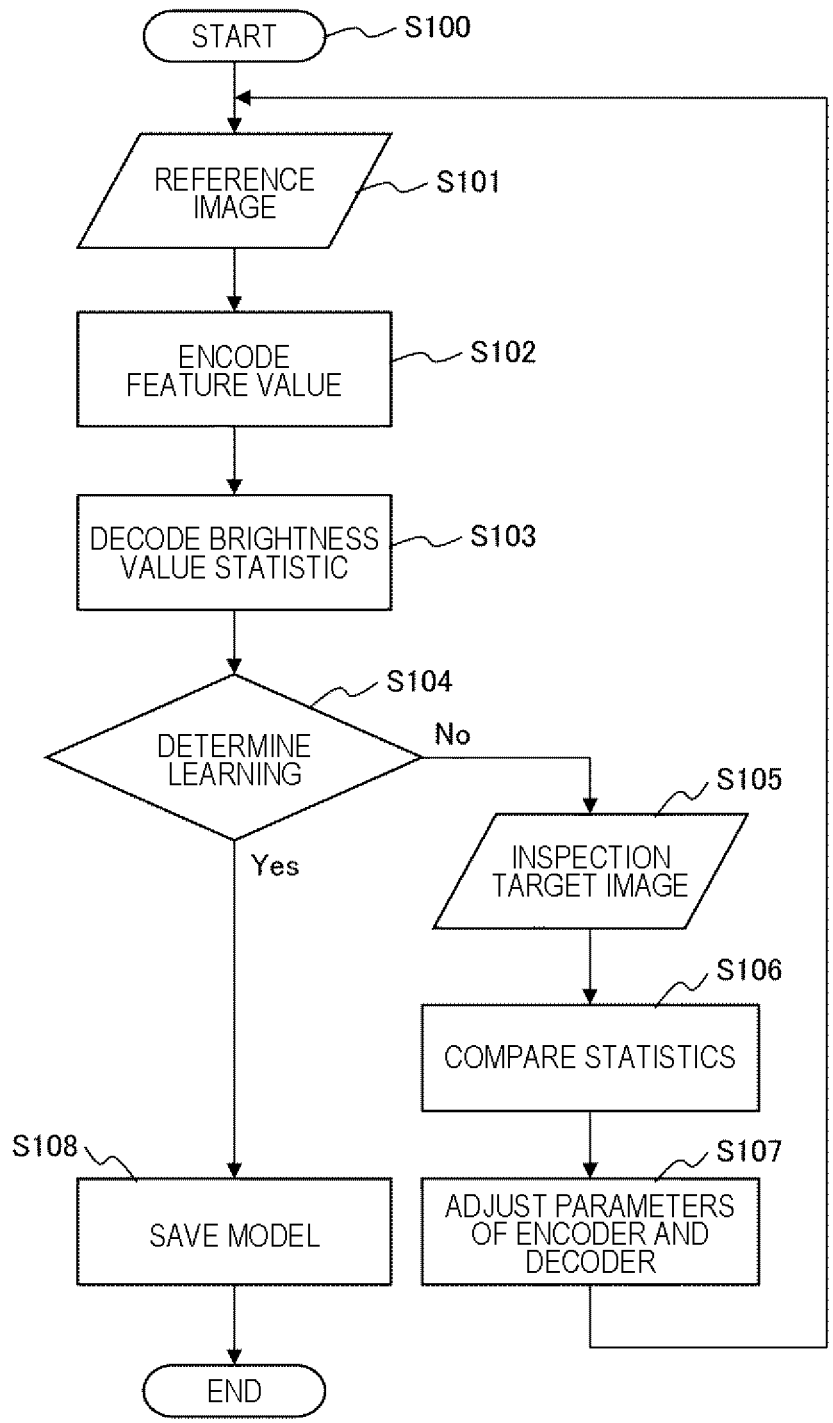
FIG. 1 is a flowchart illustrating a flow of learning of a generation model according to an example of the present invention.

FIG. 1 is a diagram illustrating an example of the model creation processing S100 performed before inspection. Before the inspection, a model for estimating a statistic (brightness value statistic below) pertaining to the brightness value of each pixel on a photographed image from a design data image is created by using the design data image and the corresponding photographed image as teacher data. Specifically, a convolutional neural network (CNN) in which an encoder is configured by two or more convolutional layers and a pooling layer, and a decoder is configured by two or more deconvolutional layers and a pooling layer is used. In this case, the learning can be performed such that the input of the encoder is the design data image itself and the output of the decoder is the brightness value statistic of the teacher data.

In the model creation processing S100, the encoder converts the design data image into a feature value for determining a feature of the design data image (S101, S102), and the decoder converts the feature value into a brightness value statistic corresponding to the design data image (S103). Then, it is determined whether the end condition of learning is satisfied (S104). If the condition is not satisfied, the output statistic is compared with the photographed image corresponding to the input design data image (S105, S106), and conversion parameters of the encoder and the decoder are changed in accordance with the comparison result (S107). On the other hand, if the condition is satisfied in S104, model data is stored (S108), and then the model creation processing S100 is ended.

The end condition of learning in S104 includes whether the number of repetitions of learning is equal to or greater than a defined number of times, whether the loss function used for learning has converged, and the like. The model data stored in S108 is configuration information of each layer of the encoder and the decoder and the conversion parameters thereof.

Each processing content will be described below in detail.

In S101, a design data image is input as a reference image. The design data image is obtained by imaging design data such as CAD. As an example, a binary image in which a wiring portion and a space portion in a circuit are painted separately is provided. In the case of a semiconductor circuit, there is a semiconductor circuit in which a wiring has two or more layers. For example, a single layer of the wiring can be used as a binary image of the wiring portion and the space portion. A double layer of the wiring can be used as a ternary image of the lower wiring portion, the upper wiring portion, and the space portion. Note that the design data image is an example of the reference image, and the present invention is not limited thereto.

The feature value output in S102 includes design information indicating to which of the wiring portion and the space portion each pixel on the design data image belongs, and design information including peripheral regions such as the vicinity of an edge and the vicinity of a corner of the wiring.

Figure 7A:
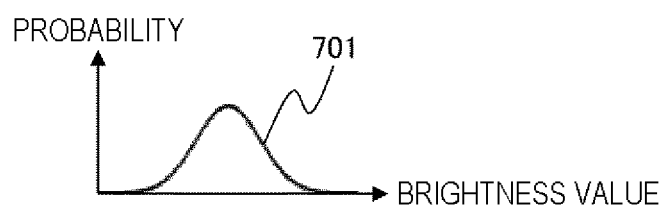
FIG. 7A is a diagram illustrating an example of brightness value distribution in each pixel on a photographed image.

The statistic output in S103 defines probability distribution (brightness value distribution below) 701 of a brightness value that can be taken by each pixel on the corresponding photographed image (FIG. 7A). The brightness value distribution is represented by a probability with respect to a brightness value that can be taken by each pixel. Specifically, if the photographed image is a grayscale image, the distribution can be defined as the frequency of 256 brightness values. In addition, the statistic may be in units other than pixels.

Figure 6A:
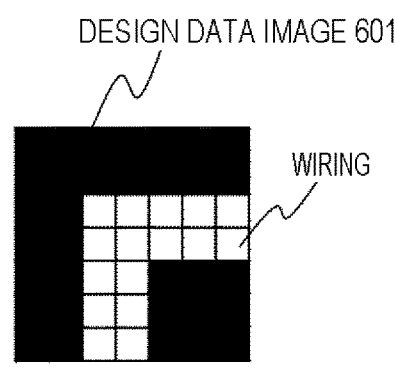
FIG. 6A is a diagram illustrating an example of a design data image 601.
Figure 6B:
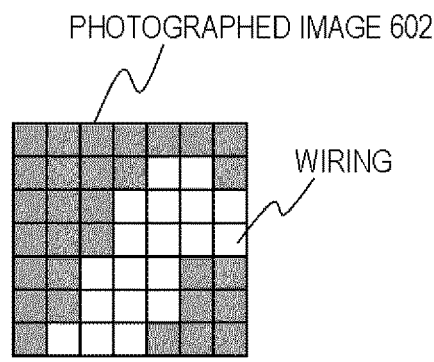
FIG. 6B is a diagram illustrating an example of a photographed image 602 corresponding to the design data image 601.
Figure 6C:
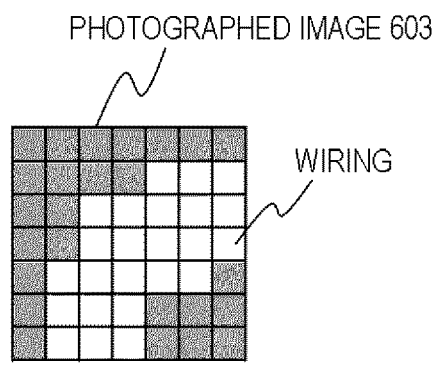
FIG. 6C is a diagram illustrating an example of a photographed image 603 corresponding to the design data image 601.
Figure 6D:
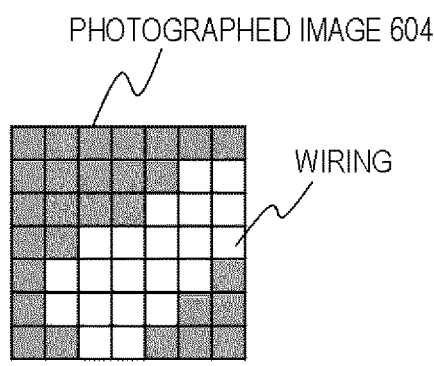
FIG. 6D is a diagram illustrating an example of a photographed image 604 corresponding to the design data image 601.

The correspondence relation between the design data image and the photographed image will be described. Specifically, an example of the shape deviation of the wiring between the design data image and the inspection target image will be described with reference to FIGS. 6A to 6D. FIG. 6A is a diagram illustrating an example of a design data image 601. FIG. 6B is a diagram illustrating an example of a photographed image 602 corresponding to the design data image 601. FIG. 6C is a diagram illustrating an example of a photographed image 603 corresponding to the design data image 601. FIG. 6D is a diagram illustrating an example of a photographed image 604 corresponding to the design data image 601.

In the design data image 601 and the photographed images 602, 603, and 604 of FIG. 6, each grid represents one pixel. The wiring of the design data image 601 has a shape difference from the wirings of the photographed images 602, 603, and 604 due to shape deformation during manufacturing, and such a shape difference varies depending on the manufacturing time. Therefore, when a certain pixel on the design data image takes a certain brightness value, there are a plurality of brightness values that can be taken by the same pixel on the photographed image. For example, if the photographed images 602, 603, and 604 are grayscale images, the brightness value that can be taken by each pixel is an integer from 0 to 255. In this case, the brightness value distribution represents a frequency with respect to the brightness value of 0 to 255. As an example of the statistic, the average and the standard deviation are considered if the brightness value distribution is a normal distribution, and the arrival rate is considered if the brightness value distribution is a Poisson distribution.

As an example of comparison processing in S106, there is difference calculation between an image sampled on the basis of the statistic and the photographed image.

The conversion parameter that is changed in S107 and stored in S108 is the weight of a filter of the convolution layer or the deconvolution layer of the CNN constituting the encoder and the decoder.

Figure 2:
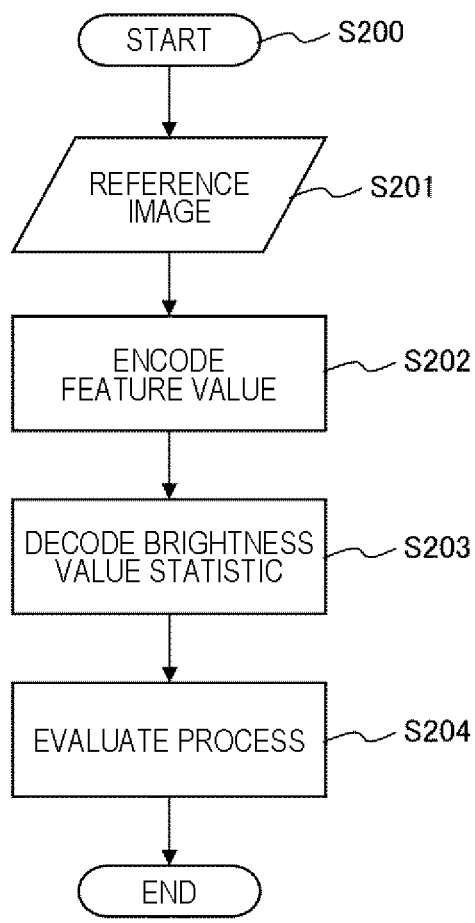
FIG. 2 is a flowchart illustrating a flow of process evaluation processing according to the example of the present invention.

FIG. 2 is a diagram for explaining an example of the process evaluation processing S200 performed during an inspection. In the process evaluation processing S200, the statistic is estimated in the similar manner to that in the estimation step of the statistic in S101, S102, and S103 in the model creation processing S100 (S201, S202, S203), and the process evaluation on the basis of the statistic is performed (S204).

The encoder in S202 and the decoder in S203 use the parameters adjusted by the model creation processing S100. Therefore, it is possible to obtain the corresponding brightness value statistic only from the design data image.

Figure 5A:
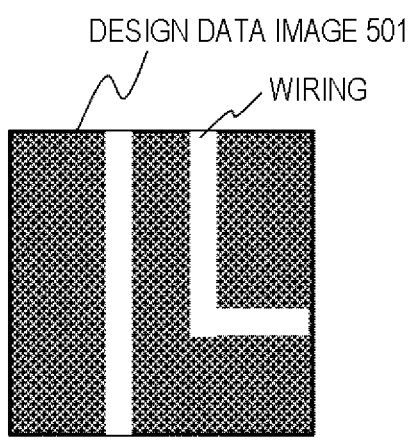
FIG. 5A is a diagram illustrating an example of a design data image 501.
Figure 5B:
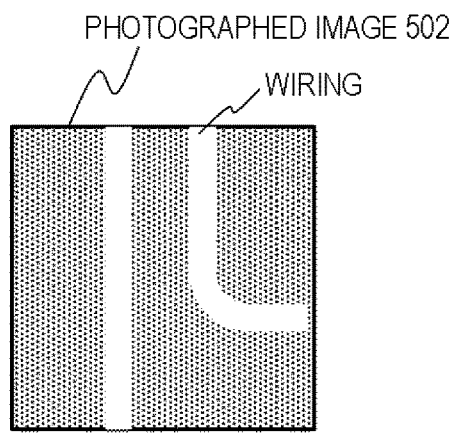
FIG. 5B is a diagram illustrating a photographed image 502 corresponding to the design data image 501.
Figure 5C:
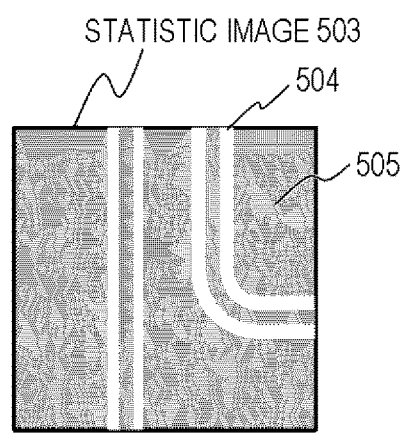
FIG. 5C is a diagram illustrating an example of a statistical image 503 corresponding to the design data image 501.

In the process evaluation in S204, generating a statistical image on the basis of the estimated statistic and displaying the statistical image as a GUI, and measuring dimensions of the statistical image are exemplified. Thus, it is possible to evaluate shape variation due to process change. FIG. 5A is a diagram illustrating an example of a design data image 501. FIG. 5B is a diagram illustrating an example of a photographed image 502 corresponding to the design data image 501. FIG. 5C is a diagram illustrating an example of a statistical image 503 corresponding to the design data image 501. The statistical image is obtained by imaging the estimated statistic. For example, when binarization is performed with the magnitude of the variation in the brightness value distribution, the statistical image is divided into a region 504 having large shape variation and a region 505 having small shape variation.

In addition, since the statistical image created in the process evaluation S204 includes an image change accompanying a process change, partial information thereof can also be used as a template image of pattern matching used for semiconductor measurement and inspection.

Figure 11:
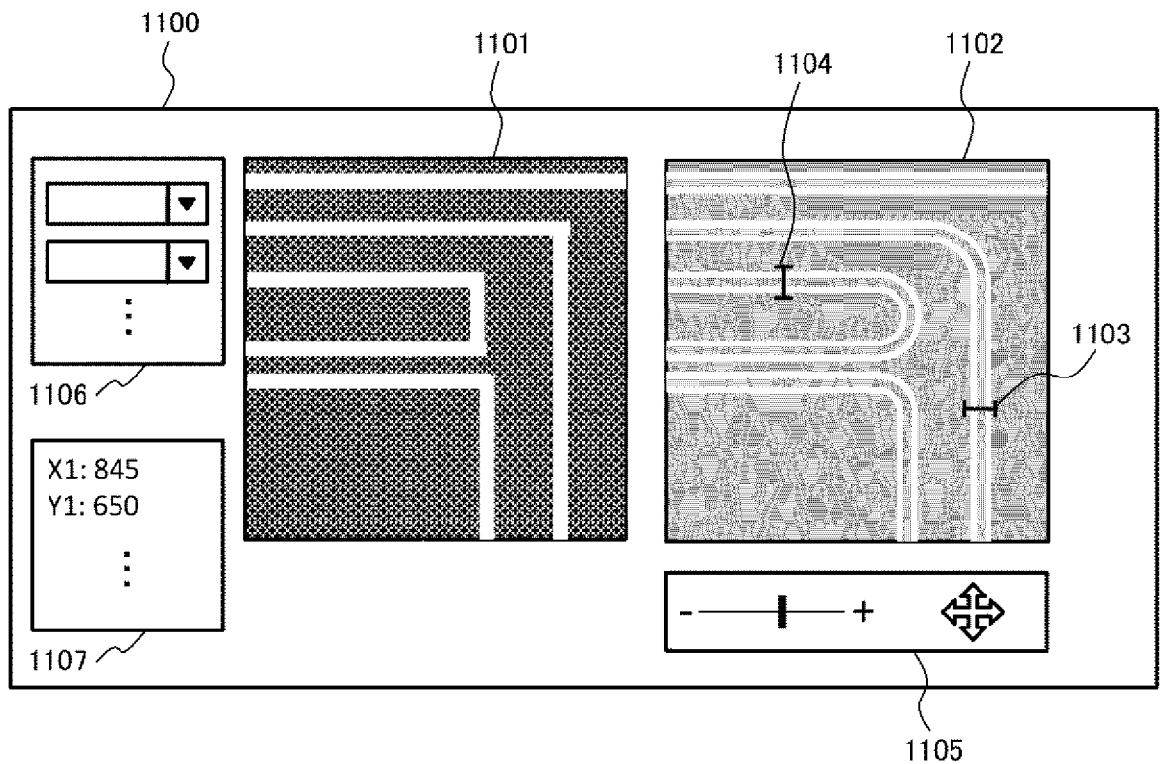
FIG. 11 is an example of a GUI screen for setting process evaluation and displaying a result of the process evaluation.

FIG. 11 is an example of process evaluation result display by a GUI 1100. The GUI 1100 displays a design data image 1101, a statistical image 1102, an operation panel 1105, an evaluation setting panel 1106, and measurement result information 1107.

When the dimensions of the statistical image 1102 are measured, the dimensions indicated by measurement points 1103 and 1104 are measured, and the result is displayed in the measurement result information 1107. The dimension to be measured is a change prediction value indicating how much the wiring is deformed in shape after manufacturing with respect to the wiring on the design data image. The position to be measured is determined by a user directly moving the measurement points 1103 and 1104 with a mouse, designating any image region on the image with the mouse, or the like. The operation panel 1105 can change the magnification, the position, and the like of an image to be displayed, in accordance with an input from the user.

In the evaluation setting panel 1106, setting items necessary for generating the statistical image 1102 are specified by input or pull-down. The setting items include a display method of a statistical image (binarized image, heat map image, or the like), a setting according to the display method (threshold setting for a binarized image, a color bar setting of a bitmap image, or the like), and the like.

In the measurement result information 1107, center coordinate values of the measurement points 1103 and 1104, dimensional values measured at the measurement points 1103 and 1104, and the like are displayed.

Figure 3:
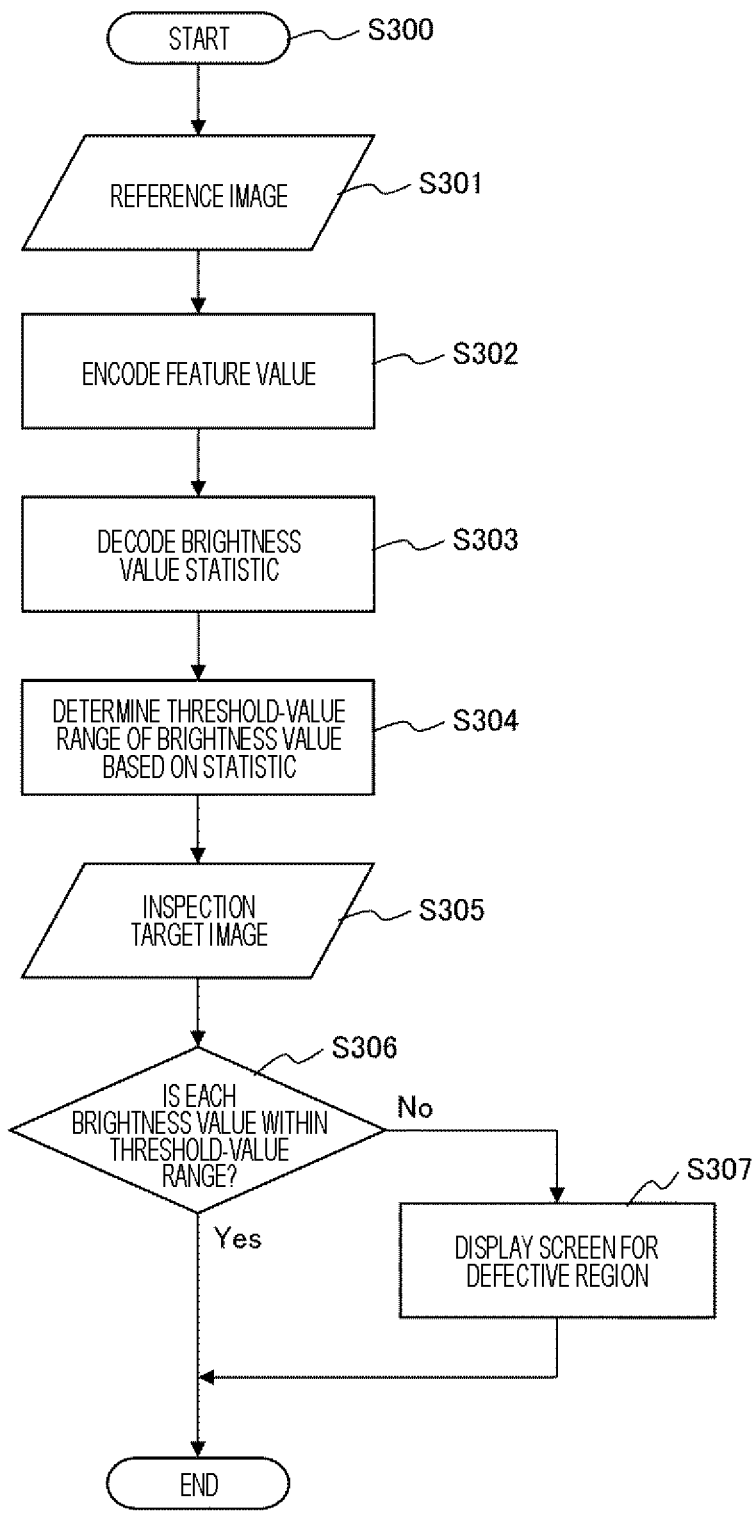
FIG. 3 is a flowchart illustrating a flow of a defect determination method according to the example of the present invention.

FIG. 3 is a diagram illustrating an example of the defect detection processing S300 performed during the inspection. In the defect detection processing S300, processing is performed as follows. Firstly, the statistic is estimated in the similar manner to the estimation step of the statistic in S101, S102, and S103 in the model creation processing S100 (S301, S302, S303). Then, the threshold-value range of the brightness value of each pixel is determined for each pixel on the basis of the statistic (S304). Further, it is determined whether or not the brightness value of the photographed image is within the threshold-value range for each pixel by using the determined threshold-value range and the photographed image of an inspection target (S305, S306). If there is a pixel having a brightness value out of the threshold-value range, the pixel is displayed on the screen as a defective region (S307).

Each processing content will be described below in detail.

The encoder in S302 and the decoder in S303 use the parameters adjusted by the model creation processing S100.

Figure 7B:
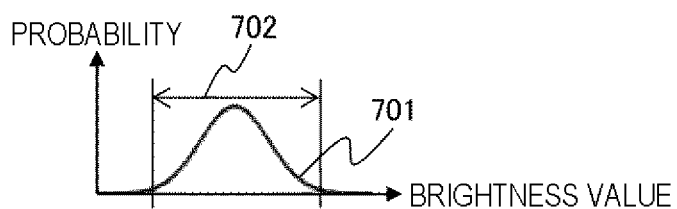
FIG. 7B is a diagram illustrating an example of estimated brightness value distribution defined by a statistic estimated from a design data image and a threshold-value range of a brightness value determined from the statistic.

In S304, the threshold-value range of the brightness value is determined on the basis of the brightness value distribution defined by the statistic estimated in S303. FIG. 7B is a diagram illustrating an example of brightness value distribution and a threshold-value range 702 determined on the basis of the brightness value distribution. For example, when the brightness value distribution is a normal distribution, a threshold-value range Th can be set as the following (Equation 1) using the average μ, the standard deviation s, and an arbitrary constant ß that are statistics defining the distribution.

$$\mu - \beta \cdot s \leq Th \leq \mu + \beta \cdot s \quad \text{(Equation 1)}$$

Such a threshold-value range is determined for each pixel. The constant ß is a parameter pertaining to the sensitivity for defect determination. The constant ß may have the same value in the entire image or may be a different value for each pixel.

In S306, the image region having the brightness value out of the threshold-value range is determined as a defective region, and the photographed image is determined as a defect image. When there is no defective region, it is determined as a normal image. For example, in a grayscale photographed image, when the brightness value of a certain pixel is "205" and a threshold-value range for the pixel is "20" to "120", the pixel is determined to be a defective region, and the photographed image is determined to be a defect image.

As an example of the screen display in S307, there are an extraction image of the defective region painted separately between the defective region and other regions, and an overlay image of the photographed image of the inspection target and the defective region.

As an example of performing the defect detection processing S300, a case of using a photographed image acquired from a wafer manufactured in the past and design data thereof, and a case of using a photographed image acquired from a wafer as an inspection target and design data thereof are exemplified.

Note that the learning processing of the generation model in FIG. 1, the process evaluation processing in FIG. 2, and the defect determination processing in FIG. 3 may be performed by different programs or may be executed by individual programs. Alternatively, any two types of processing may be performed by one program. Furthermore, similarly to the program, regarding the device that performs the types of processing, the types of processing may be performed by one device or different devices.

Figure 4:
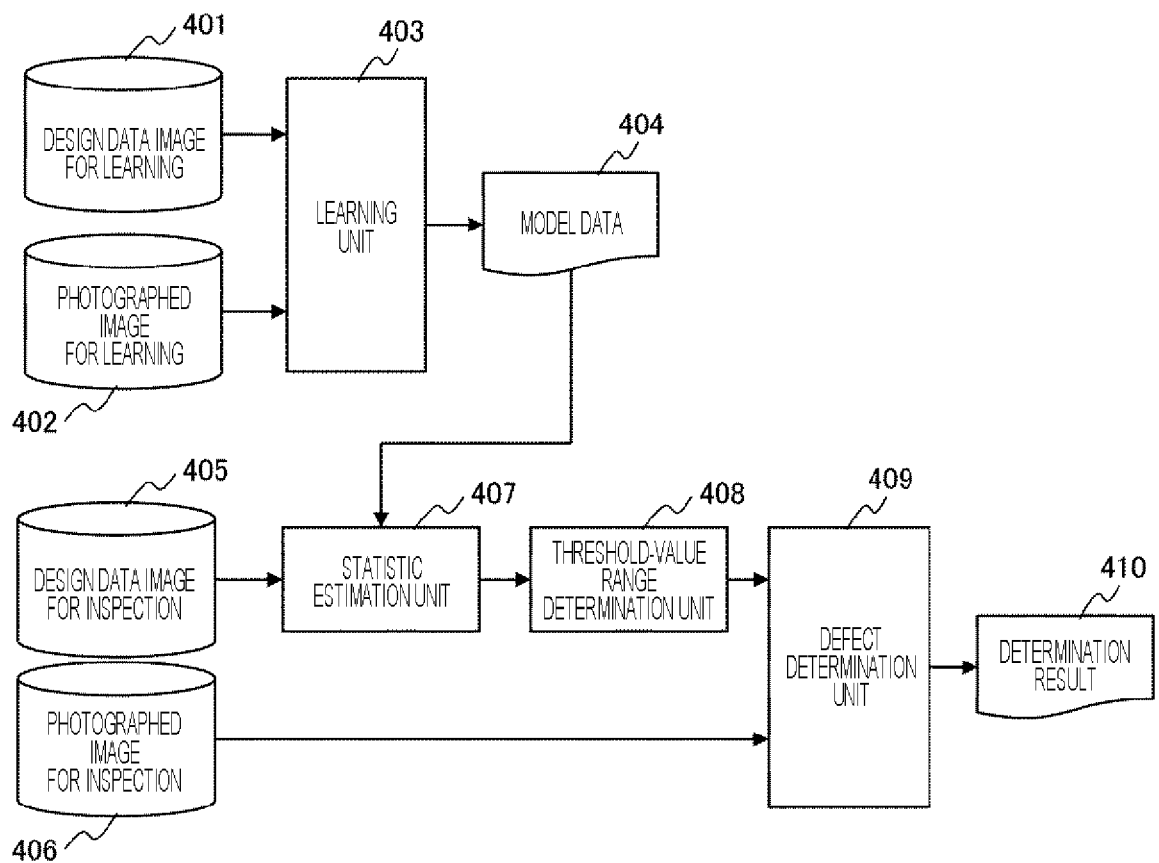
FIG. 4 is a diagram illustrating a functional block diagram according to the example of the present invention.

FIG. 4 is a functional block diagram of a defect detection system including the model creation processing S100 and the defect detection processing S300 in the present example. A learning unit 403, a statistic estimation unit 407, a threshold-value range determination unit 408, and a defect determination unit 409 are implemented by programs. A design data image 401 for learning, a photographed image 402 for learning, a design data image 405 for inspection, and a photographed image 406 for inspection are stored in the storage medium 2405.

The learning unit 403 uses the design data image 401 for learning and the photographed image for learning by machine learning to create a model for estimation as a statistic fir defining a brightness value distribution of each pixel on the photographed image from the design data image.

The learning unit 403 performs the model creation processing S100 before an inspection, by using the design data image 401 for learning and the photographed image 402 for learning. At this time, model data 404 having information of parameters of the encoder and the decoder is obtained from the learning unit 403. The statistic estimation unit 407 estimates the statistic pertaining to the brightness value of each pixel on the corresponding photographed image, from the design data image 405 for inspection. The statistic estimation unit can be configured by a model including an encoder and a decoder, and these parameters are reflected by the model data 404. The statistic estimated by the brightness value distribution estimation unit is used as a threshold-value range of brightness values for defect determination in the threshold-value range determination unit S408. The defect determination unit 409 obtains a determination result 410 by comparing the threshold-value range of each pixel determined by the threshold-value range determination unit 408 with the photographed image 406 for inspection. The determination result 410 may be a defect image in which the defective region and the other regions on the image are painted separately, or may be an image in which the defect image and the photographed image 406 for inspection are combined.

The photographed image 402 for learning and the photographed image 406 for inspection may be photographed on the same wafer or may be photographed on different wafers. Note that, in the case of use for defect detection in which shape deformation in a normal range is allowed, as a target in the present embodiment, it is preferable that the photographed image 402 for learning and the photographed image 406 for inspection have the same manufacturing condition and imaging condition.

Figure 8A:
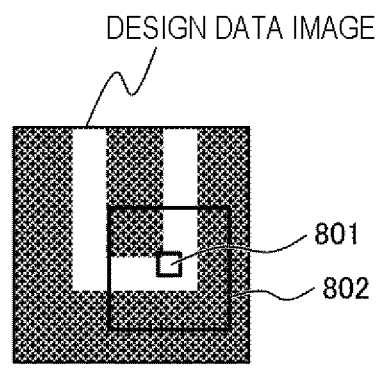
FIG. 8A is a diagram illustrating a pixel of interest and a peripheral region thereof on the design data image.
Figure 8B:
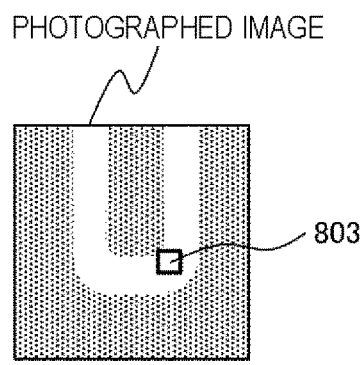
FIG. 8B is a diagram illustrating an estimation target pixel on the photographed image at the same position as the pixel of interest.

FIG. 8A is a diagram illustrating a pixel 801 of interest and a peripheral region 802 thereof on the design data image. FIG. 8B is a diagram illustrating pixels 803 on the photographed image. It is assumed that the pixel 801 of interest and the pixel 803 have the same coordinates on each image. The statistic of the brightness values that can be taken by the pixel 803 is estimated from the pixel values of the pixel 801 of interest and the peripheral region 802. This is because the arithmetic operation including the surrounding pixels is performed when the calculation is performed in the convolution layer of the CNN. Note that the size of the peripheral region 802 is determined by the stride number of the CNN, the filter size, and the like.

Figure 9:
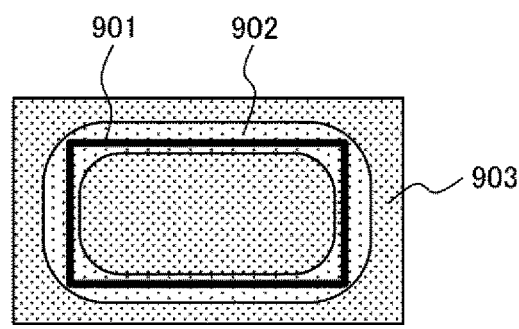
FIG. 9 is a diagram for explaining a relation between an edge of the design data image and a threshold-value range of shape deformation determined on the basis of the edge.

FIG. 9 is a diagram for explaining the relation between the edge of a circuit pattern and the threshold-value range determined in S302 to S304. Since shape deformation due to manufacturing frequently occurs in the vicinity of the edge of the wiring, it is considered that the threshold-value range of a region 902 close to an edge 901 becomes larger. On the other hand, since the shape deformation rarely occurs in a region away from the edge of the wiring, it is considered that the threshold-value range of a region 903 away from the edge 901 becomes smaller.

Figure 10:
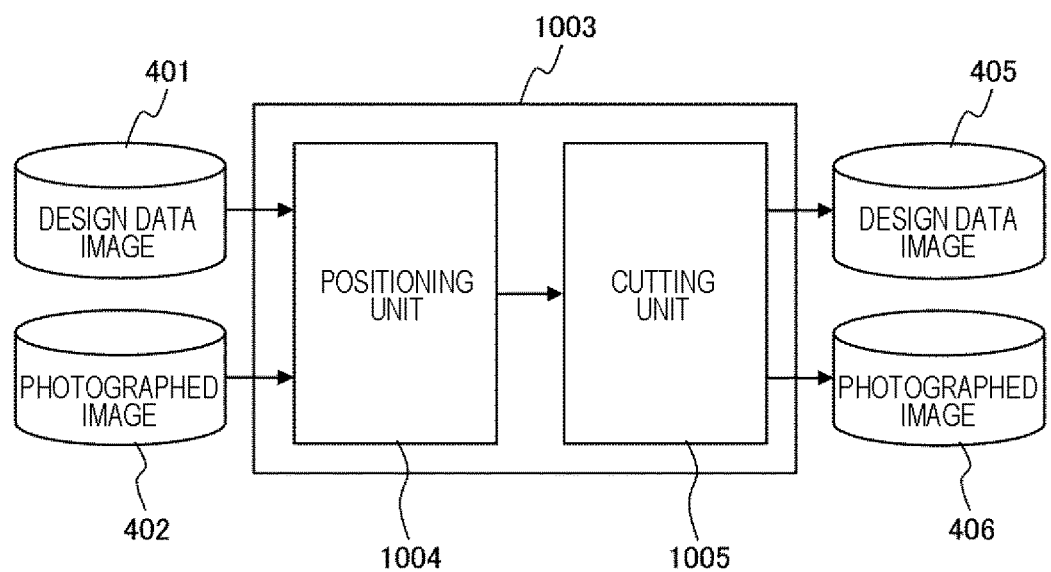
FIG. 10 is a diagram illustrating an example of processing performed on the design data image and the photographed image before learning or an inspection.

FIG. 10 is a diagram illustrating an example of pre-processing for a learning data set and an inspection data set according to the present embodiment. The pre-processing unit 1003 can be configured by a positioning unit 1004 and a cutting unit 1005. First, the positions of the design data image 401 for learning and the photographed image 402 for learning of the circuit that manufactured the design data image for learning are aligned on the image such that the circuit patterns match with each other by the positioning unit 1004. As an example of an alignment method, there is a method of obtaining contour lines of wirings of a design data image and a photographed image, and performing positioning so that centroids of figures surrounded by the contour lines coincide with each other. Then, by the cutting unit 1005 performing processing of cutting out the design data image and the photographed image to the same image size, the positions of the design data image 405 for inspection and the photographed image 406 for inspection on the image correspond to each other.

For the learning data set including the design data image 401 for learning and the photographed image 402 for learning, and the learning data set including the design data image 405 for inspection and the photographed image 406 for inspection, it is desirable that the pre-processing unit 1003 illustrated in FIG. 10 perform alignment between the design data image and the photographed image and adjusts the image size before the inspection.

Figure 12:
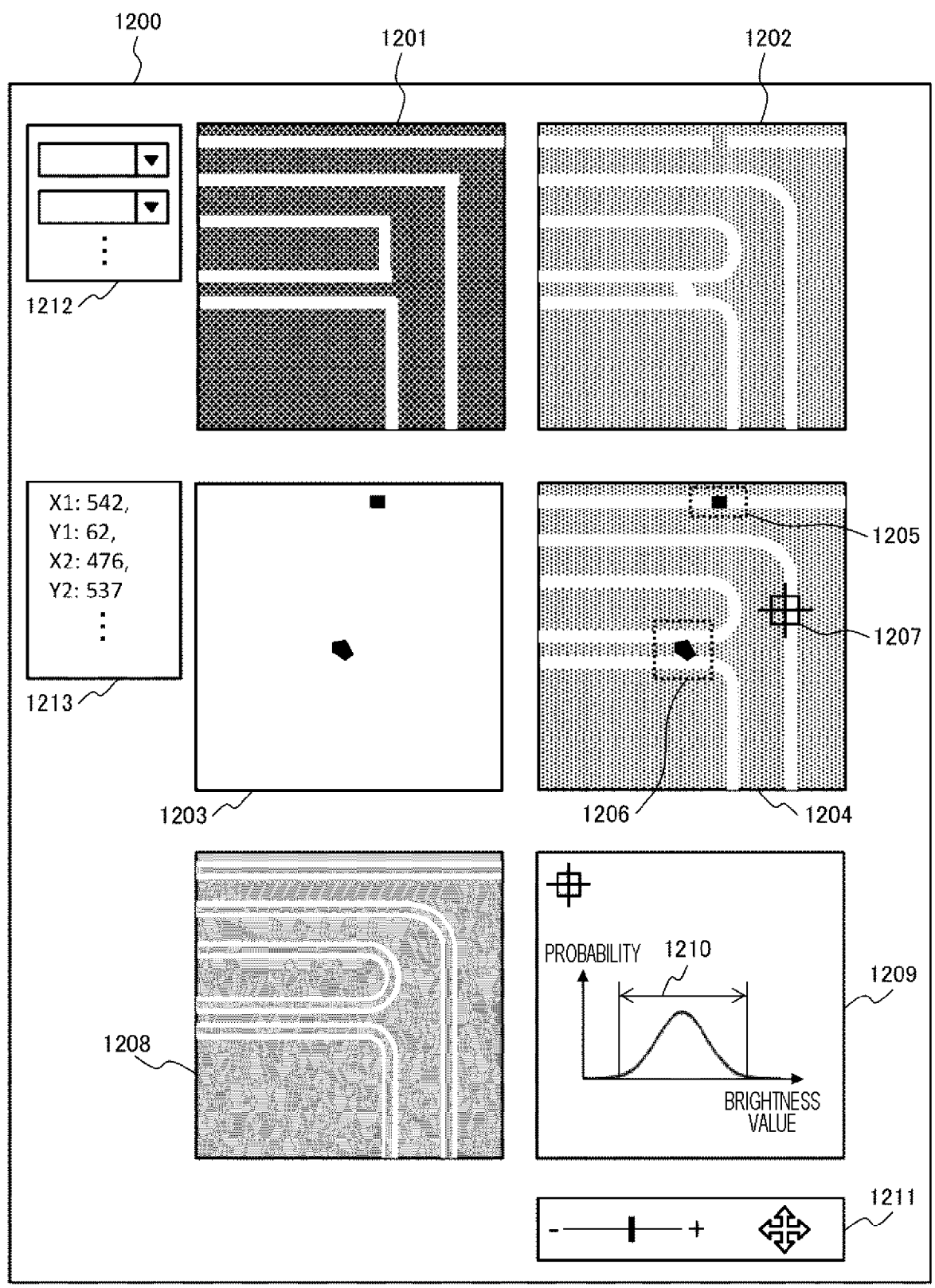
FIG. 12 is an example of a GUI screen for setting defect detection and displaying a result of the defect detection.

FIG. 12 is an example of defect detection result display by a GUI 1200.

The GUI 1200 displays a design data image 1201, an inspection target image 1202, a defect image 1203, an overlay image 1204, a threshold value image 1208, a brightness value distribution image 1209, an operation panel 1211, an inspection setting panel 1212, and inspection information 1213. In this example, a defect detection result for one photographed image is displayed on one screen.

The defect image 1203 is an image in which a defective region detected using the design data image 1201 and the inspection target image 1202, and other regions are color-coded. The overlay image 1204 is an image in which the inspection target image 1202 and the defect image 1203 are superimposed. On the overlay image 1204, defective regions 1205 and 1206 are displayed surrounded by lines. The defective regions 1205 and 1206 are determined as one or a plurality of defective regions on the basis of the coordinates of the pixels determined to be defective.

The threshold value image 1208 is an image of the threshold-value range of each pixel determined in the threshold-value range determination processing S304. This image may be a binary image on the basis of the size of the threshold-value range, or a bitmap image.

A position 1207 of interest on the overlay image 1204 represents the position of the pixel displayed on the brightness value distribution image 1209. The position 1207 of interest is designated on the overlay image 1204 by the user using a mouse or the like.

In the brightness value distribution image 1209, not only the brightness value distribution but also the threshold-value range 1210 may be displayed.

The operation panel 1211 can change the magnification, the position, and the like of an image to be displayed.

In the inspection setting panel 1212, parameters necessary for the threshold-value range determination processing S304, parameters necessary for determining the defective regions 1205 and 1206, and the like are designated by a keyboard input or pull-down.

The inspection information 1213 displays center coordinate values of the defective regions 1205 and 1206, coordinate values of the position 1207 of interest, and the like.

Examples of the SEM recipe will be described. Design data and the like can be registered in the recipe for inspection. Depending on an example of the defect detection processing or the process evaluation processing, model data created in the model creation processing S100 can be registered, or the statistical image generated in the process evaluation processing S200 can be registered.

Note that, the present invention is not limited to the above examples, and various modifications may be provided. For example, the above examples are described in detail in order to explain the present invention in an easy-to-understand manner, and the above embodiments are not necessarily limited to a case including all the described configurations.

According to the present example, it is possible to estimate the shape deformation in the normal range of the sample, as the statistic, from the design data image on the basis of the correspondence relation between the reference image such as the design data of the sample and the photographed image.

For example, it is possible to estimate the shape deformation in the normal range in the circuit pattern (inspection target pattern) to be inspected can be estimated from the design data image on the basis of the correspondence relation between the design data image of the semiconductor circuit acquired in advance of the inspection and the image obtained by photographing the circuit pattern. Therefore, it is possible to detect only the defect portion without frequently generating false reports with respect to the shape deviation between the design data image and the inspection target pattern in the comparison inspection between the design data image and the inspection target pattern. In addition, since the shape deformation in the normal range is directly estimated from the design data image, it is possible to reduce the processing time as compared with the case of combining a plurality of simulation images. In addition, as one effect of the present example, it is possible to generate a model in consideration of an image quality difference between design data and photographed data.

Note that the present example can be applied to a sample other than a semiconductor as a sample as the inspection target. In addition, the present invention is also applicable to measurement other than inspection including use of input data (shape measurement by radar) other than images and defect inspection.

In addition, as an example of the effect of the present example, it is possible to estimate the shape variation in the normal range of a sample as the inspection target, from the design data image on the basis of the correspondence relation between the design data image of the sample acquired before the inspection and the photographed image of the sample. Thus, it is possible to detect only the defective portion without frequently generating false reports with respect to the shape deviation between the design data image and the sample in the comparison inspection. In addition, since the shape variation in the normal range is directly estimated from the design data image, it is possible to reduce the processing time as compared with a case where a plurality of simulation images is compared with the photographed image of the inspection target in a round-robin manner.

REFERENCE SIGNS LIST

S100 model creation processing
S200 process evaluation processing
S300 defect detection processing
501 design data image
502 photographed image
503 statistical image
701 brightness value distribution
702 threshold-value range
1100 GUI for process evaluation result display
1200 GUI for defect detection result display

The invention claimed is:

1. A non-transitory computer-readable medium storing an image processing program for performing an inspection on a sample by using reference data of the sample, and input data pertaining to the sample, the image processing program causing a processor to implement:
receiving the reference data;
calculating, by a convolutional neural network, a feature value pertaining to the sample based on the reference data;
calculating a statistic indicating probability distribution of the input data based on the feature value; and
determining whether a defect exists in the sample based on the feature value and the statistic.

2. The non-transitory computer-readable medium according to claim 1, wherein the image processing program further causes the processor to implement:
determining necessity of learning for a parameter for calculating the feature value and a parameter for calculating the statistic;
when the learning is determined to be needed, receiving the input data, comparing the statistic with the input data, and changing the parameter for calculating the feature value and the parameter for calculating the statistic in accordance with a result of the comparison; and
when the learning is determined not to be needed, storing the parameter for calculating the feature value and the parameter for calculating the statistic as model data.

3. The non-transitory computer-readable medium according to claim 1, wherein the image processing program further causes the processor to implement:
receiving the input data;
comparing the statistic with the input data; and
evaluating the sample by using a result of the comparison.

4. The non-transitory computer-readable medium according to claim 3, wherein the evaluation of the sample is a defect inspection on the sample or a shape variation evaluation of the sample due to a process change.

5. The non-transitory computer-readable medium according to claim 1, wherein a value indicating the input data is a value indicating a shape or a physical property of the sample.

6. The non-transitory computer-readable medium according to claim 3, wherein the image processing program further causes the processor to implement:
displaying the statistic or a result of the evaluation on a display screen.

7. An image processing device for performing an inspection on a sample by using reference data of the sample, which is stored in a storage medium, and input data pertaining to the sample, the image processing device comprising:
a processor programmed to
calculate, by a convolutional neural network, a feature value pertaining to the sample based on the reference data; and
calculate a statistic indicating probability distribution of the input data based on the feature value; and
determine whether a defect exists in the sample based on the feature value and the statistic.

8. The image processing device according to claim 7, wherein the processor is further programmed to:
determine necessity of learning for a parameter for calculating the feature value and a parameter for calculating the statistic;
receive the input data;
compare the statistic with the input data; and
change and store the parameter for calculating the feature value and the parameter for calculating the statistic,
wherein, when the learning is determined to be needed, the processor compares the statistic with the input data, and changes the parameter for calculating the feature value and the parameter for calculating the statistic, and
when the learning is determined not to be needed, the processor stores the parameter for calculating the feature value and the parameter for calculating the statistic, as model data.

9. The image processing device according to claim 8, wherein the processor is further programmed to:
evaluate the sample by using a result of the comparison.

10. The image processing device according to claim 9, wherein evaluation of the sample is a defect inspection on the sample or a shape variation evaluation of the sample due to a process change.

11. The image processing device according to claim 7, wherein a value indicating the input data is a value indicating a shape or a physical property of the sample.

12. The image processing device according to claim 9, further comprising:
a display screen on which the statistic or the result of the evaluation is displayed.

13. An image processing method for performing an inspection on a sample by using reference data of the sample, which is stored in a storage medium, and input data pertaining to the sample, the image processing method comprising steps of:
receiving the reference data;
calculating, by a convolutional neural network, a feature value pertaining to the sample based on the reference data;
calculating a statistic indicating probability distribution of the input data based on the feature value; and
determining whether a defect exists in the sample based on the feature value and the statistic.

14. The image processing method according to claim 13, further comprising steps of:
determining necessity of learning for a parameter for calculating the feature value and a parameter for calculating the statistic;
when the learning is determined to be needed, receiving the input data, comparing the statistic with the input data, and changing the parameter for calculating the feature value and the parameter for calculating the statistic in accordance with a result of the comparison; and when the learning is determined not to be needed, storing the parameter for calculating the feature value and the parameter for calculating the statistic as model data.

15. The image processing method according to claim 13, further comprising steps of:
   receiving the input data;
   comparing the statistic with the input data; and
   evaluating the sample by using a result of the comparison.

16. The image processing method according to claim 15, wherein the evaluation of the sample is a defect inspection on the sample or a shape variation evaluation of the sample due to a process change.

17. The image processing method according to claim 13, wherein a value indicating the input data is a value indicating a shape or a physical property of the sample.

18. The image processing method according to claim 15, further comprising:
   displaying the statistic or a result of the evaluation.

* * * * *